United States Patent Office 3,262,816
Patented July 26, 1966

3,262,816
FUEL CELL INCLUDING A METAL HYDRIDE
ELECTRODE
Ingemar Lindholm, Vasteras, Sweden, assignor to Allmanna Svenska Elektriska Aktiebolaget, Vasteras, Sweden, a corporation of Sweden
No Drawing. Filed Nov. 26, 1962, Ser. No. 240,171
Claims priority, application Sweden, Nov. 29, 1961, 11,860/61
2 Claims. (Cl. 136—120)

Electrical energy may be generated by means of a reaction between a continuously supplied combustible substance such as, for example, hydrogen, and a continuously supplied oxidising agent such as, for example, oxygen, air or a halogen in a so-called fuel cell, which in its simplest form may consist of a suitable fluid electrolyte and two porous electrodes immersed in it, of which one is arranged between the electrolyte and the combustible substance and the other between the electrolyte and the oxidising agent.

The electrode reactions in the fuel cell occur in the contact places between electrolyte, combustible or oxidising agent and electrode. These contact places are situated on those places in the electrodes where electrolyte and combustible or oxidising agent are adjacent to each other. The active places in the electrodes when the reaction is taking place are therefore in the pore surfaces.

A porous electrode in a fuel cell does not need to form a separating wall between a gas chamber containing a gaseous substance, such as a fuel, and an electrolyte chamber containing a fluid electrolyte. The combustible substance may namely be dispersed or dissolved in the electrolyte, as is the case with cells for fluid fuel and the electrolyte with its fuel then occurs on both sides of the electrode and also in its pores. Certain oxidising agents, e.g. hydrogen peroxide, may also be dissolved in the used electrolyte and then the conditions for the electrode on the oxidising agent side will be analogous with those described for the electrode on the fuel side in fuel cells with fluid fuel.

In fuel cells it is known to use electrodes, which essentially are constructed of nickel, and in which the areas nearest to the pore walls contain nickel in activated form. Outside the parts of the electrode situated nearest to the pore walls nickel is present in inactive form and its work there is to act as carrier material for the active areas situated nearest to the pore walls. Such an electrode may according to a known method be manufactured by using nickel powder and a powder consisting of an aluminium nickel alloy ("Raney-alloy"). A mixture of the powder is compressed thereby to an electrode which is then sintered. After the sintering the aluminium is removed by means of alkali from the aluminium nickel alloy ("Raney-alloy") in the sintered product, micro-pores being thus formed. The area around the pores becomes active because of the large pore surfaces and the disturbed crystal lattices which the remaining material has after the treatment with alkali. The pure nickel powder acts after the sintering, as previously indicated, as carrier for the electrode, while the material of the alloy remaining after the treatment with alkali forms the active areas which surround the pores. As substitute for the pure nickel powder for the known electrode carbon, iron and cobalt powder have been suggested, and as substitute for the mentioned alloy other alloys in which nickel may be replaced by cobalt or iron, and aluminium with with silicon, magnesium or zinc. The electrodes are usable as fuel electrodes for hydrogen.

It has now been found possible to manufacture an electrode material which has fundamental advantages over that known previously. The electrode material is thus directly usable after the sintering and need not be subjected to any subsequent treatment, such as a soaking process in alkali. Another important advantage is that the electrode material has very good mechanical properties. Further, the electrode material is resistant to air and in contrast to the known electrode already described, it can be stored without difficulty in room atmosphere. Another especially important advantage of the new electrode material is that during its use high current densities can be reached, even at operating temperature lower than 100° C. In addition a very important property is that the electrode material is usable for continuous operation at high temperatures, significantly exceeding 100° C., which above all has great importance with the slower reaction fuels such as hydrocarbons and alcohols.

The object of the invention is a porous electrode material, preferably for use in fuel cells, which comprises a material active at contact between an oxidizable agent, e.g. hydrogen, and an electrolyte in the pores, arranged at least at the pore surfaces of the electrode material. The invention is characterised in that the active material is composed of a hydride of titanium, zirconium or hafnium or a mixture containing at least two of these hydrides. According to the invention the electrode material may comprise in addition to the active material an inactive carrier material for the active material, preferably consisting of one of the substances iron, nickel, cobalt, carbon, tungsten and molybdenum. The sintered porous electrode consists suitably of particles of the active material and the inactive material sintered together with the particles of each material equally distributed over all the electrode material. The active material may thereby suitably constitute 2–40 percent of the electrode material weight.

Titanium has itself been used earlier in connection with hydrogen gas electrodes. Thus electrodes are known which are composed of a solid palladium sheet, on the hydrogen side of which titanium-hydride is arranged, while the side of the electrode facing the electrolyte is composed of pure palladium. The titanium hydride is thus in this case not in contact with the electrolyte and constitutes in itself therefore no active material for the conversion between hydrogen and electrolyte. The purpose of the titanium hydride in this known case is to facilitate absorption of hydrogen by the electrode at very low temperatures, whereby the hydrogen after absorption on the titanium hydride side by means of diffusion through the palladium reaches that side of the palladium sheet where the electrolyte is arranged and where the electrochemical reaction takes place. Consequently it is the palladium which constitutes the active material for the electrode reaction.

The electrode material may be manufactured by means of a powder consisting of particles of the active material or a mixture containing particles of the active material and particles of the inactive carrier material being formed by means of pressing or the like into an electrode material, which is sintered in vacuum, hydrogen gas atmosphere or inert atmosphere. By inert atmosphere is meant an atmosphere which does not destroy the active material comprising the hydride. If the sintering is carried out at a temperature lower than the decomposition temperature for the active material, the sintering may conveniently occur in the vacuum or inert atmosphere. If, on the other hand, the sintering occurs at a temperature higher than the decomposition temperature it is necessary at least to subsequently treat the sintered product in hydrogen gas atmosphere under such conditions that the hydride is re-formed.

The electrode material may also be manufactured by means of a powder consisting of particles of titanium, zirconium, or hafnium or mixtures of at least two of these substances, and a mixture containing the above-named particles and particles of the inactive carrier material by means of pressing or the like, being formed into an electrode material, which is sintered in hydrogen gas atmosphere. The sintering in that case may also be carried out in vacuum or inert atmosphere followed by a subsequent treatment of the sintered product in hydrogen gas atmosphere under such conditions that the used substance titanium, zirconium or hafnium is converted into the corresponding hydride.

Other methods of manufacturing a porous electrode material according to the invention are also conceivable, inter alia by means of electrolytic precipitation of the metal being a component of the active material out of a salt melt on a porous bed, for example a porous nickel sheet, and a subsequent treatment in hydrogen of the product obtained at a temperature lower than the decomposition temperature of the hydride in question.

The particle size of the materials may be varied within wide limits depending on the fuel and electrode type used. The size of the pores in a manufactured electrode is defined to a great extent by the size of the used particles. In most applications it is desirable that all pores are the same size, which is attained by using well demarcated powder fractions. In order to increase the porosity of the electrode the mixture of the particles may be mixed with up to about 25% by weight of an expanding agent, e.g. ammonium carbonate or ammonium bicarbonate, having the capacity to dissociate into gaseous products during the sintering process.

The invention shall be explained in more detail in connection with the description of a number of embodiments.

*Example 1*

17 parts by weight titanium hydride powder with an average particle size of about $15\mu$ are mixed with 76 parts by weight carbonyl nickel powder with an average particle size of around $5\mu$ and 7 parts by weight ammonium bicarbonate with an average particle size of around $70-80\mu$. The mixture is pressed into electrodes with a diameter of 36 mm. and a thickness of 2 mm., with a pressure of 1000 Kiloponds/cm.$^2$ and is sintered 30 min. in hydrogen or argon atmosphere at 680° C. The electrode is usable as fuel electrode for e.g. hydrogen. The titanium hydride powder may wholly or partly be replaced by powder of zirconium or hafnium hydride.

*Example 2*

17 parts by weight titanium powder with an average particle size of about $30\mu$ are mixed with 83 parts by weight carbonyl nickel powder with an average particle size of around $5\mu$. The mixture is put into moulds and sintered into electrodes with a diameter of 36 mm. and a thickness of 2 mm. for 30 min. in hydrogen atmosphere at 800° C. The electrode is cooled slowly in hydrogen to 600° C. which is lower than the decomposition temperature (ca. 750° C.) of the titanium hydride, hydrogen being thereby dissolved in titanium. The electrode is usable as fuel electrode for e.g. hydrogen.

*Example 3*

10 parts by weight zirconium powder with an average particle size of about $25\mu$ are mixed with 83 parts by weight carbonyl nickel powder with an average particle size of around $5\mu$ and 7 parts by weight ammonium bicarbonate with an average particle size of around $70-80\mu$. The mixture is pressed into electrodes with a diameter of 36 mm. and a thickness of 2 mm. with a pressure of 1000 Kiloponds/cm.$^2$ and is sintered 30 min. in hydrogen atmosphere at 680° C. The electrode is usable as fuel electrode for e.g. hydrogen.

*Example 4*

10 parts by weight hafnium powder with an average particle size of about $25\mu$ are mixed with 83 parts by weight carbonyl nickel powder with an average particle size of around $5\mu$ and 7 parts by weight ammonium bicarbonate with an average particle size of around $70-80\mu$. The mixture is pressed into electrodes with a diameter of 36mm. and a thickness of 2 mm. with a pressure of 1000 Kiloponds/cm.$^2$ and is sintered 30 min. in hydrogen atmosphere at 680° C. The electrode is usable as fuel cell electrode for e.g. hydrogen.

*Example 5*

5 parts by weight titanium powder with an average particle size of about $30\mu$ are mixed with 88 parts by weight iron powder with an average particle size of around $20\mu$ and 7 parts by weight ammonium bicarbonate with an average particle size of around $70-80\mu$. The mixture is pressed into electrodes with a diameter of 36 mm. and a thickness of 2 mm. with a pressure of 3000 Kiloponds/cm.$^2$ and is sintered 30 min. in hydrogen atmosphere at 800° C. The sintered electrode is cooled slowly in hydrogen to 600° C., hydrogen being thereby dissolved in titanium. The electrode is usable as fuel electrode for e.g. hydrogen.

*Example 6*

10 parts by weight titanium powder with an average particle size of around $30\mu$ are mixed with 83 parts by weight molybdenum powder with an average particle size of around $25\mu$ and 7 parts by weight ammonium bicarbonate with an average particle size of around $70-80\mu$. The mixture is pressed into electrodes with a diameter of 36 mm. and a thickness of 2 mm. with a pressure of 2000 Kiloponds/cm.$^2$ and is sintered 60 min. in hydrogen atmosphere at 1000° C. The sintered electrode is cooled slowly in hydrogen to 600° C., hydrogen being thereby dissolved in titanium. The electrode is usable as fuel electrode for e.g. hydrogen.

*Example 7*

Titanium powder with an average particle size of $125\mu$ is pressed with 2000 Kiloponds/cm.$^2$ into electrodes with a diameter of 36 mm. and a thickness of 2 mm. and is sintered in vacuum for 2 hours at 900° C. The electrodes are afterwards treated in hydrogen atmosphere for 30 min. at 500° C. The electrode is usable as fuel electrode for e.g. hydrogen.

The titanium powder may wholly or partly be replaced by zirconium or hafnium powder.

The electrodes described might be used in fuel cells with different electrolytes, such as for example potassium or sodium hydroxide solutions. The electrode material may not only be formed into sheets but also as grain, particles or the like, etc. Such electrode material in grain or particle form is used in fuel cells with fluid fuel, for example alcohol dissolved in the electrolyte, where for example it can be arranged in a container manufactured from a net or perforated plate. The electrode material may even be used in fuel cells of the type where the electrolyte consists of an ion exchange membrane of organic or inorganic type.

I claim:

1. A fuel cell comprising a sintered porous electrode consisting essentially of at least one substance selected from the group consisting of (1) a hydride from the group of titanium, zirconium and hafnium hydrides; and
(2) a carrier therefor and containing at least two percent by weight of said hydride; and an electrolyte in which said electrode is immersed, the electrolyte entering the pores of the electrode, and the hydride being in contact with the electrolyte at least at the pore surfaces of the electrode.

2. A fuel cell as claimed in claim 1 in which said carrier material is selected from the group consisting of iron, nickel, cobalt, carbon, tungsten and molybdenum.

References Cited by the Examiner

UNITED STATES PATENTS

| 2,631,115 | 3/1953 | Fox | 136—121.25 |
| 2,946,836 | 7/1960 | Justi | 136—120 |
| 3,093,514 | 6/1963 | McCallum et al. | 136—120 |

WINSTON A. DOUGLAS, *Primary Examiner.*

JOHN H. MACK, *Examiner.*

W. VAN SISE, A. SKAPARS, *Assistant Examiners.*